United States Patent
Buddenberg et al.

(10) Patent No.: US 7,811,458 B2
(45) Date of Patent: *Oct. 12, 2010

(54) METHOD FOR TREATING AQUEOUS SLUDGE, MATERIAL SO PRODUCED AND THE USE THEREOF

(75) Inventors: Thorsten Buddenberg, Krefeld (DE); Holger Herrmann, Duisburg (DE); Hartmut Pawel, Porta Westfalica (DE); Otto Schroers, Krefeld (DE); Wolfgang Hoeppner, Bremen (DE); Volker Hartmann, Thedinghausen (DE)

(73) Assignees: Stockhausen GmbH & Co. KG, Krefeld (DE); Detlef Hegeman GmbH & Co. KG, Bremen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/477,957

(22) Filed: Jun. 4, 2009

(65) Prior Publication Data

US 2009/0236562 A1    Sep. 24, 2009

Related U.S. Application Data

(63) Continuation of application No. 10/565,236, filed as application No. PCT/EP2004/005803 on May 28, 2004, now Pat. No. 7,553,423.

(30) Foreign Application Priority Data

Jul. 22, 2003  (DE) ................. 103 33 478

(51) Int. Cl.
*C02F 11/14* (2006.01)

(52) U.S. Cl. .............. 210/709; 34/356; 106/697; 106/724; 106/795; 210/727; 210/734; 210/747; 405/128.75; 588/255

(58) Field of Classification Search .............. 210/710
See application file for complete search history.

(56) References Cited

U.S. PATENT DOCUMENTS

| | | | |
|---|---|---|---|
| 3,544,456 A | 12/1970 | Shanfelt et al. | |
| 3,975,266 A | 8/1976 | Baize | |
| 3,977,971 A | 8/1976 | Quinn et al. | |
| 4,347,140 A | 8/1982 | Condolios et al. | |
| 4,911,848 A | 3/1990 | Cardini et al. | |
| 5,355,594 A | 10/1994 | Hwang | |
| 5,462,672 A | 10/1995 | Iji et al. | |
| 5,902,487 A | 5/1999 | Pickering et al. | |
| 6,221,956 B1 | 4/2001 | Chen | |
| 7,264,734 B2 | 9/2007 | Kelly et al. | |
| 7,553,423 B2* | 6/2009 | Buddenberg et al. | ........ 210/709 |

FOREIGN PATENT DOCUMENTS

| | | |
|---|---|---|
| DE | 35 37 455 | 4/1987 |
| DE | 35 44 909 | 6/1987 |
| DE | 197 26 899 | 1/1998 |
| DE | 20304220 | 5/2003 |
| EP | 0 500 199 | 8/1992 |
| GB | 1 466 185 | 3/1977 |

OTHER PUBLICATIONS

Rao, S. Ramachandra, "Flocculation and Dewatering of Alberta Oil Sands Tailings", International Journal of Mineral Processing, vol. 7, No. 3, pp. 245-253, 1980.

* cited by examiner

*Primary Examiner*—Peter A Hruskoci
(74) *Attorney, Agent, or Firm*—Oblon, Spivak, McClelland, Maier & Neustadt, L.L.P.

(57) ABSTRACT

The invention relates to a method for the accelerated dehydration of sludges in sludge disposal areas, especially of sludges from rivers and harbors, by the exclusive use of anionic polymer flocculants and the use of materials obtained according to the inventive method.

19 Claims, No Drawings

METHOD FOR TREATING AQUEOUS SLUDGE, MATERIAL SO PRODUCED AND THE USE THEREOF

CROSS-REFERENCE TO RELATED APPLICATIONS

This application is a continuation of U.S. Ser. No. 10/565,236 filed Jul. 26, 2006, now U.S. Pat. No. 7,553,423, which is a 371 of PCT/EP04/05803 filed May 28, 2004 and claims the benefit of DE 103 33 478.5 filed Jul. 22, 2003.

The present invention relates to a method for accelerated dewatering of sludges in silt fields, especially of sludges from rivers and harbors, by the use of polymeric flocculating agents, and to the use of material obtained by this method.

Inorganic and organic sediments are constantly transported downstream by river currents. These sediments accumulate in the rivers and harbors. In GB 1116290 it is proposed that polymer solutions be flushed into deeper layers of these sediments in order to initiate flocculation processes that on the whole lead to loosening of the deposits, so that they can be carried away by water currents. Polyacrylic acid and polyacrylamide among other compounds are cited as polymers. Copolymers contain at least 50 mol % of acrylic acid or methacrylic acid. Furthermore, cationic polymers are also described as suitable.

Modern practice, however, is to remove these sediments from the water by dredgers. The sediments frequently contain environmentally hazardous constituents in the form, for example, of complexed heavy metal ions or hazardous organic substances, and so it is no longer permissible to dump them in deeper waters, as was frequently done in the past. Instead, they must be consigned to ultimate storage under environmentally safe conditions on land.

To permit proper ultimate storage, the sediments, which may contain up to 20 wt % of organic constituents depending on their origin, must be appropriately pretreated. In the method now being used in practice, the dredged sediment sludges are transported in barges to the facilities provided for sludge treatment and flushed at rates of 1000 to 6000 m³/h through pipelines to appropriate dewatering fields. Dewatering of the sludges takes place during sedimentation by seepage into drains, by draining off the supernatant water formed during sedimentation and by natural drying. After a semi-solid consistency has been reached, drying of the sludge is continued by multiple mechanical turning (DE 19726899 A1; Heinrich Girdes GmbH, 1998).

The additional input of water due to weather influences leads to remoistening of the sludges and in this way slows the drying operation. Depending on location, rainfall can cancel out evaporative drying in as many as 8 months of the year. The entire process of sludge conditioning needs up to one year and can be greatly prolonged up to 18 months by higher contents of fine-grained sludge fractions in the size range of 0.06 mm and smaller, since deposits thereof form sediment layers that are almost impervious for water and block seepage through drainage devices (see also Prof. Fritz Gehbauer, Institute for Mechanical Engineering in Construction, Fridericiana University, Imb Veröffentlichung, Series V, No. 20, Floating Dredger Technology, Chapter 3.2. Definitions, page 29). Because of the lower density of fine-grained sludges, the dewatering basins hold less dry substance for the same filling level, meaning that the sludge throughput is reduced compared with coarse-grained sludges. To achieve sufficient vane shear strength, which is necessary for further processing of dried sludge, the fine-grained sludge must be dried to a water content of 60 wt %, whereas coarse-grained sludge already meets the strength requirements at 65 to 70 wt %.

In U.S. Pat. No. 3,312,070 (Daiichi Kogyo Seiyaku Kabushiki Kaisha, 1967), the use of surface-active auxiliaries having a coagulating effect is proposed for recovery of sludges, which without these auxiliaries tend to separate into fine and coarse fractions. This in turn results in different material properties of the recovered sludges. Among other examples in the patent, reaction products of acrylamide and carboxymethylcellulose, polyacrylamide, polyvinyl alcohol, mixtures of polyacrylamide with aniline-urea-formaldehyde resins and sulfomethylated polyacrylamide are used. The auxiliaries are metered into the feed line that transports the sludges to the settling basins.

In EP 346159 A1 (Aoki Corp., 1989), it is stated that the method of conventional sludge dewatering, in which the negatively charged sludge particles are treated with cationic salts or cationic polymers, is disadvantageous in terms of flocculation effectiveness and costs. As an alternative, the successive addition of an anionic and a cationic polymeric coagulating agent and if necessary of a further anionic flocculating agent is proposed for sludge dewatering. Because of the practical circumstances, whereby the flocculating agent is mixed in with the rapid stream of aqueous sludge before it enters the sludge settling basin, it is not guaranteed that two or three different flocculating agents matched to one another can be successfully metered in so that they will interact to form sedimented sludge flocs.

From EP 0500199 B1 (Detlef Hegemann GmbH & Co., 1996) there is known a method for conditioning of the contaminated sediments from bodies of water to obtain a building material that is durably safe for the environment, wherein the sediments are formed to an environmentally safe building material by means of clay materials and cement/slaked lime after they have been dried to a water content of approximately 120 to 140%.

The object of the present invention is to provide, for dewatering of sludges from rivers and harbors and sandbanks or sea floors, a method that permits rapid and cost-effective dewatering and that can be achieved as simply as possible in the existing field-dewatering systems. In view of the high velocities of transport of the sludges and the associated high shear loads, it is intended that the method to be provided will lead to rapid flocculation and stable flocs. In particular, it is intended that the method will be advantageously usable even for sludges that are particularly difficult to dewater because of their content of fine particles.

As regards performing the method, an important aspect, with a view to subsequent use of the dried sludges, is that environmentally hazardous products be avoided.

Another object of the method to be provided is to minimize the time for natural drying of the partly dewatered sludge remaining after separation of the supernatant water and of the drainage water. A further object of the invention is to bind the hazardous substances present in the aqueous sludges so strongly to the dewatered sludges that subsequent addition of substances for binding hazardous substances can be reduced or avoided and the dried sludges can be directly further processed or dumped.

The object is achieved according to the invention by a method for dewatering of sludge wherein the sludge

- is adjusted to a pumpable concentration by addition of water
- is flushed through a pipeline to a dewatering field
- is mixed with an aqueous solution of a polymeric flocculating agent while it is being transported is sedimented in the dewatering field and partly freed of supernatant and/or drainage water and then subjected to natural evaporative drying characterized in that the flocculation is achieved with a water-soluble, anionic, polymeric flocculating agent.

The anionic polymers to be used according to the invention have a weight-average molecular weight Mw of higher than $1.0 \times 10^7$, preferably higher than $1.2 \times 10^7$ and particularly preferably higher than $1.5 \times 10^7$.

The anionic polymers to be used according to the invention are formed from water-soluble, nonionic and anionic monomer constituents. Examples of usable nonionic monomers are acrylamide and methacrylamide, the hydroxyalkyl esters of acrylic and methacrylic acid, preferably 2-hydroxyethyl and 2-hydroxypropyl esters, acrylonitrile, vinylpyrrolidone and N-vinylacetamide and mixtures thereof. Preferably acrylamide is used.

Examples of usable anionic monomers are unsaturated monocarboxylic and dicarboxylic acids, such as acrylic acid, methacrylic acid, itaconic acid, maleic acid, fumaric acid, vinylsulfonic acid, acrylamidoalkanesulfonic acids, vinylphosphonic acid and/or their salts with alkalis, ammonia, (alkyl)amines or alkanolamines and mixtures of these monomers. Preferably acrylic acid and its alkali salts are used.

For modification of the polymer properties, the polymers to be used according to the invention can contain up to 10 wt % of further monomers that are insoluble or slightly soluble in water, provided they do not impair the water solubility of the polymer. Examples of such monomers are vinyl acetate and alkyl acrylates, such as methyl acrylate, ethyl acrylate, butyl acrylate, ethylhexyl acrylate.

The content of anionic monomer constituents in the anionic polymers to be used according to the invention ranges from 1 to 40 wt %, preferably 5 to 30 wt % and particularly preferably 10 to 20 wt %.

As regards the somewhat coarser sludges, it has been found that in some cases an anionic polyacrylamide with an anionic content of 30 to 40 wt % has a particularly good flocculating effect.

In a further advantageous embodiment of the invention, there is used a mixture of two different anionic flocculating agents, wherein the differences can be both in the chemical structure of the anionic monomer components and in the proportions by weight of the anionic monomer components. The use of a mixture of polymers having different proportions by weight of anionic monomer constituents is preferred.

As an alternative to the polymers synthesized from nonionic and anionic monomers, there can also be used polymers that were originally formed from nonionic monomer constituents and in which anionic groups are generated by partial hydrolysis, for example of ester-like and/or amide-like nonionic constituents. An example in this regard is anionic polyacrylamide generated by hydrolysis of polyacrylamide homopolymer.

The anionic polyacrylamides can be produced by various polymerization methods, an example being the gel polymerization method, in which the aqueous monomer solution, after initiation, is polymerized adiabatically to a gel, which is then subjected to size reduction, drying and grinding to polymer powder. To improve the dissolution behavior, the polymer powders are often coated at the surface, for example with finely divided aerosils or else with water glass. Furthermore, the polymers can also exist in the form of a water-in-oil emulsion, which is inverted to an oil-in-water emulsion before application. Preferably an aqueous solution of powdery polymers is used.

The aqueous polymer solution is produced by dissolving or diluting powdery polymers or emulsified polymers and is added as a dilute solution. The concentration of the polymer solution is usually lower than 2 wt %, preferably lower than 1% and particularly preferably lower than 0.5 wt %.

The sludge dredged from rivers and harbors, for example, or from the sea floor or sandbanks is adjusted with water to a pumpable concentration, preferably to a density of 1.04 to 1.15 metric tons per $m^3$ and transported through pipelines to the sludge-dewatering fields. A measuring device that determines the instantaneous sludge concentration is mounted in the pipelines. By means of the measurement signal the necessary quantity of flocculating agent is calculated and metering of the flocculating agent is initiated.

The anionic polymers are added to the aqueous sludges as aqueous solution, addition taking place in the feed line transporting the aqueous sludge to the dewatering basin. Intimate mixing of the polymer solution with the sludge is achieved by the turbulence in the flowing slurry and can be assisted if necessary by mixing elements, preferably static mixing elements. The point of addition of the polymer solution into the sludge feed line can be chosen such that the flocculation process has already begun or is just beginning at the inlet to the dewatering basin.

Surprisingly, it has been found that the flocs produced according to the inventive method are very stable, and thereby destruction of already formed flocs by friction effects during sludge transport is prevented. By virtue of the high stability of the flocs produced by the inventive method, the point of addition of the solution of flocculation agent into the sludge flow can also be located far from the inlet to the settling basin. Because sludge flocculation begins rapidly, it is also possible to meter the flocculation agent in right at the inlet to the settling basin. In a preferred embodiment, metering of the flocculating agent takes place over a short mixing section ahead of the inlet, especially less than 20 m therefrom.

The quantity of anionic polymer necessary for the inventive method depends on the concentration and composition of the sludges, and it can be determined by simple preliminary experiments. Relative to the solids content of the sludge, the proportion of polymeric flocculating agent added usually ranges from 0.02 to 2 wt %, preferably 0.05 to 1 wt % and particularly preferably 0.09 to 0.5 wt %.

The achievement of the object by the inventive method is surprising insofar as it permits flocculation and sedimentation of the negatively charged sludge particles by the use of anionic flocculating agents alone, without addition of further flocculation auxiliaries. In particular, sludges containing fines can be advantageously processed, since the floc structure formed no longer prevents blocking of the drainage dewatering.

The time advantages achieved by the inventive method are considerable. In the conventional treatment without flocculation auxiliary, and starting from a raw density of approximately 1.04 to 1.15 metric tons per $m^3$ for the sludge to be subjected to the treatment, the supernatant water can be drained off after approximately 2 to 7 weeks in the case of coarse sludges and after approximately 4 months in the case of fine sludges. At that time the sludge has a density of approximately 1.16 metric tons per $m^3$ in the case of fine-grained sludges and 1.22 metric tons per $m^3$ in the case of coarser sludges. Fine-grained sludges within the meaning of the present disclosure are sludges whose content of particles in the size range of 0.06 mm and smaller is at least 50 wt %.

At this time, mechanical turning is begun, in order to promote natural drying by evaporation. Depending on season and weather conditions, this operation is ended after a few months, at which time the sludge has a density of approximately 1.47 metric tons per m$^3$ and can be sent to final use. In the inventive method, the supernatant water can already be drained off within the first 24 hours, and this improved drainage dewatering is accompanied by a much drier sludge. At this time the sludge already has a density of 1.25 to 1.35 metric tons per m$^3$ and then can either be sent directly to further processing or dried more intensively by evaporative drying, if necessary coupled with mechanical working. Densities of higher than 1.45 metric tons per m$^3$ and preferably of 1.47 metric tons per m$^3$ or higher are usually achieved after evaporative drying. The dried sludges produced in the inventive method have vane shear strengths of greater than 25 kN/m$^2$, preferably of greater than 30 kN/m$^2$.

The mechanical working of the sludge leads to regular breaking of the sludge surface, whereby evaporative drying is accelerated. This working can be applied by excavators, for example, which turn the sludge regularly, or else by rotary hoes, which work the surface of the sludge very intensively. According to the invention, rotary hoes are preferably used.

In the inventive method, the water separated from the surface and by drainage in the dewatering field is returned to the sludge-transfer point via closed circular pipelines and reused for dilution of the delivered sludge.

Surprisingly, the partly dewatered sludge obtained after separation of supernatant and drainage water exhibits only a slight tendency to reabsorb newly arriving water. By virtue of this property, the weather-related prolongation of the natural sludge drying is greatly reduced, since rainwater, for example, now collects mainly in the surface region of the sedimented sludge and no longer remoistens or slurries the sludge.

After the sludges have reached the desired degree of dryness, they are deposited in dumps or processed to an environmentally safe building material, for example to a sealing material, to edge fill or to pavement structures. Products manufactured according to the inventive method have advantageous material properties.

Since the hazardous substances present in the aqueous sludge are incorporated into the flocs formed in the inventive method, the addition of agents that bind hazardous substances can be reduced or even dispensed with. Thus the sludges can be directly dumped or further processed to building materials once they have been dried.

The use of anionic polyacrylamides does not cause any environmentally hazardous burden of the sludge, and so further processing free of problems is possible.

In the further processing of highly contaminated sludges to an environmentally safe building material, the addition of mineral fillers, especially of clays, slaked lime and cement or mixtures thereof has proved advantageous. In particular, 1 to 15 wt % of each of these substances is mixed homogeneously into the sludge.

Determination Methods

Dewatering by the Screen-Test Method

By means of this method, polymeric flocculating agents are tested with regard to their suitability for conditioning and dewatering of sludges.

In a 700-ml graduated beaker, 500 ml of sludge is mixed with the 0.25% flocculating-agent solution to be tested and stirred with a 4-finger stirrer at 1000 rpm for a certain time. After this conditioning, the sludge sample is filtered (=dewatered) on a metal screen (200 micrometer mesh openings). The dewatering time for a filtrate volume of 200 ml is measured, and the clarity of the collected filtrate is evaluated optically in a clarity wedge.

Clarity "0"=no clarification

Clarity "46"=best clarification

Sedimentation Experiment

In a 600-ml glass beaker, 500 ml of mud and a certain volume of 0.25% flocculating-agent solution are stirred with a 4-finger stirrer at 1000 rpm for 10 seconds. The volume (ml) of clarified water formed above the sediment is evaluated as a function of sedimentation time (minutes).

Vane Shear Strength

The shear strength of the dewatered sludge is measured with a vane probe. The vane probe is composed of a rod, at the bottom end of which there are disposed 4 vanes. The dimensions and mode of operation are standardized according to DIN 4096. To perform the experiment, the vane probe is pressed into the sludge and turned slowly until the sludge breaks along a cylindrical sliding surface. The vane shear strength is calculated from the torque M measured at break and the diameter d of the vane probe.

$$FS=6\times M/7\times \pi \times d^3$$

EXAMPLES

Polymers Used

The anionic polymers used all had an average molecular weight Mw of higher than 15 million; the cationic polymers had an Mw of higher than 6 million. All polymers were used in the form of their 0.25 wt % solutions.

Polymer A: cationic polyacrylamide with a 25 wt % content of quaternized dimethylaminopropylacrylamide Polymer B: cationic polyacrylamide with a 10 wt % content of quaternized dimethylaminopropylacrylamide Polymer C: cationic polyacrylamide with a 6 wt % content of quaternized dimethylaminopropylacrylamide Polymer D: anionic polyacrylamide with a 1.5 wt % content of acrylic acid sodium salt Polymer E: anionic polyacrylamide with a 10 wt % content of acrylic acid sodium salt Polymer F: anionic polyacrylamide with a 15 wt % content of acrylic acid sodium salt Polymer G: anionic polyacrylamide with a 40 wt % content of acrylic acid sodium salt Sludge Sample 1

For this there was used harbor mud from Bremen with a concentration of 10.3% of dry substance, corresponding to a density of 1.066 metric tons per m$^3$. The average particle size was Dm=0.0564 mm, determined from the particle-size line in the diagram obtained by the semilogarithmic plot of log particle diameter versus particle content by mass. The content of particles smaller than 0.06 mm was 70 wt %. The particle charge was negative and was determined with the PCD 03 pH meter of the Mütek Co. (from Herrsching, Germany) by polyelectrolyte titration to the isoelectric point. The measured value was −230 mV. The ignition loss of the dry substance was 13.2%, determined at 600° C./2.5 h.

Sludge Sample 2

For this there was used harbor mud from Bremerhaven with a concentration of 9.5% of dry substance, corresponding to a density of 1.062 metric tons per m$^3$. The average particle size was Dm=0.0212 mm, determined from the particle-size line in the diagram obtained by the semilogarithmic plot of log particle diameter versus particle content by mass. The content of particles smaller than 0.06 mm was 100 wt %. The particle charge was negative and was determined with the PCD 03 pH meter of the Mütek Co. (from Herrsching, Germany) by polyelectrolyte titration to the isoelectric point. The measured value was −410 mV. The ignition loss of the dry substance was 15.5%, determined at 600° C./2.5 h.

Example 1

500 ml of sludge sample 2 was mixed with 40 ml of polymer solution in the sedimentation experiment and sheared for 10 sec. After a sedimentation time of 1 minute, the following volumes of clarified water were measured:

| Polymer | Volume [ml] of clarified water |
| --- | --- |
| B | 5 |
| C | 20 |
| D | 210 |
| E | 240 |
| F | 260 |
| G | 25 |
| none | 0 |

When the experiment was repeated with increased shearing (sheared for 30 sec), the following volumes of clarified water were measured after sedimentation times of 1 and 2 minutes:

| Polymer | Volume [ml] of clarified water | |
| --- | --- | --- |
| | after 1 minute | after 2 minutes |
| B | 5 | 10 |
| E | 260 | 270 |

Example 2

500 ml of sludge sample 2 was mixed with 80 ml of polymer solution in the sedimentation experiment and sheared for 10 sec. After a sedimentation time of 1 minute, the following volumes of clarified water were measured:

| Polymer | Volume [ml] of clarified water |
| --- | --- |
| A | 180 |
| D | 270 |
| E | 260 |
| F | 220 |
| G | 10 |
| none | 0 |

Example 3

In a dewatering experiment by the screen-test method, the following results were obtained with sludge sample 1 and added polymer in a concentration of 100 g of dry substance per m³ of sludge:

| Polymer | Clarity wedge | Time [sec] for 200 ml of filtrate |
| --- | --- | --- |
| A | 46 | 167 |
| B | 46 | 52 |
| D | 46 | 18 |
| E | 46 | 6 |
| F | 46 | 6 |
| G | 46 | 11 |

When the added flocculating agent was increased to 300 g of dry substance per m³ of sludge, the results were as follows:

| Polymer | Clarity wedge | Time [sec] for 200 ml of filtrate |
| --- | --- | --- |
| D | 31 | 5 |
| E | 27 | 15 |
| F | 22 | 31 |
| G | 21 | 102 |

Example 4

500 ml of sludge sample 1 was mixed with 40 ml of polymer solution in the sedimentation experiment and sheared for 10 sec. After a sedimentation time of 1 minute, the following volumes of clarified water were measured:

| Polymer | Volume [ml] of clarified water |
| --- | --- |
| B | 60 |
| D | 140 |
| E | 150 |
| F | 150 |
| G | 160 |
| none | 0 |

At increased shearing (30 sec stirring time), the flocculation results achieved according to the invention proved to be extremely stable:

| Polymer | Volume [ml] of clarified water |
| --- | --- |
| B | 10 |
| E | 160 |

Example 5

500 ml of sludge sample 1 was mixed with 80 ml of polymer solution in the sedimentation experiment and sheared for 10 sec. After a sedimentation time of 1 minute, the following volumes of clarified water were measured:

| Polymer | Volume [ml] of clarified water |
| --- | --- |
| B | 100 |
| D | 190 |
| E | 190 |
| F | 180 |
| G | 130 |
| none | 0 |

Example 6

500 ml of sand was flushed into a vertical plexiglass tube of 80 mm diameter and 500 mm length, covered at the bottom end with a 200 μm screen.

1000 ml of fine-grained dredged sludge from Bremerhaven with a solids content of 15.3% and a density of 1.10 metric tons per m$^3$ was mixed with 160 ml of a 0.25% solution of polymer E in polder water and conditioned at 1000 rpm for 10 sec with a 4-finger stirrer.

1000 ml of this mixture was filled into the plexiglass tube and the dewatering behavior as well as the sludge density was determined:

|  | Experiment duration [h] | | | | |
| --- | --- | --- | --- | --- | --- |
|  | 1 | 2 | 4 | 7 | 24 |
| Filtrate [g] | 616 | 672 | 702 | 727 | 739 |
| Density [metric tons per m$^3$] | 1.20 | 1.23 | 1.25 | 1.26 | 1.27 |

The invention claimed is:

1. A method for the dewatering of sludge including negatively charged particles obtained from rivers, harbors, the sea floor, or sandbanks, comprising
    adjusting the concentration of the sludge to a pumpable concentration by addition of water,
    flushing the sludge through a pipeline to a dewatering field,
    mixing the sludge with an aqueous solution of a polymeric flocculating agent while it is being transported,
    allowing the sludge to settle in the dewatering field to form a sediment and partly freeing the sludge of supernatant and/or drainage water and then subjecting the sludge to natural evaporative drying,
    wherein the polymeric flocculating agent is a water-soluble, anionic, polymeric flocculating agent that contains from 5 to 30 percent by weight of anionic monomer units and has a weight-average molecular weight Mw of higher than $1.0 \times 10^7$.

2. The method according to claim 1, wherein the anionic polymeric flocculating agent is formed from anionic and nonionic monomers wherein acrylic acid, methacrylic acid, itaconic acid, maleic acid, fumaric acid, vinylsulfonic acid, acrylamidoalkanesulfonic acids, vinylphosphonic acid and/or their salts with alkalis, ammonia, (alkyl)amines or alkanolamines or mixtures of these monomers are used as the anionic monomers and wherein acrylamide, methacrylamide, acrylonitrile, hydroxyalkyl esters of acrylic and methacrylic acid, vinylpyrrolidone or vinylacetamide or mixtures of these monomers are used as the nonionic monomers.

3. The method according to claim 1, wherein the polymeric flocculating agent contains 10 to 20% by weight of integrally polymerized anionic monomer constituents.

4. The method according to claim 1, wherein at least two different anionic flocculating agents are used.

5. The method according to claim 1, wherein the polymeric flocculating agent is added in a proportion of 0.02 wt % to 2 wt % relative to the solids content of the sludge.

6. The method according to claim 1, wherein the polymeric flocculating agent is used in the form of an aqueous solution with a concentration of lower than 2 wt %.

7. The method according to claim 6, wherein the polymer solution is prepared from a powdery polymer.

8. The method according to claim 1, wherein the sludge to be dewatered contains at least 50 wt % of fine particles in the size range of 0.06 mm or smaller.

9. The method according to claim 1, wherein the flocculating agent is metered into the pipeline over a section between the outlet to the dewatering field and 150 m ahead of the outlet.

10. The method according to claim 9, wherein the evaporative drying of the sludge is continued to a density of at least 1.45 metric tons per m$^3$.

11. The method according to claim 10, wherein the sludge has a vane shear strength of greater than 25 kN/m$^2$.

12. The method according to claim 1, wherein a measuring device in the pipeline determines the sludge concentration, calculates the quantity of flocculating agent therefrom and initiates metering of the flocculating-agent solution.

13. The method according to claim 1, wherein the sludge treated with the flocculating agent has a density of 1.25 to 1.35 metric tons per m$^3$ after dewatering and before natural evaporative drying.

14. The method according to claim 1, wherein the natural evaporative drying is accelerated by mechanically turning the sludge.

15. The method according to claim 14, wherein the mechanical turning is achieved by means of rotary hoes.

16. The method according to claim 1, wherein the dewatered and dried sludge is mixed with clays and/or slaked lime and/or cement in proportions of 1 to 15 wt % each.

17. A dewatered sludge prepared according to the method as claimed in claim 1.

18. A building material comprising the dewatered sludge prepared according to the method as claimed in claim 1.

19. The method according to claim 1, wherein the anionic polymeric flocculating agent is a copolymer of acrylamide and acrylic acid.

* * * * *